United States Patent [19]

Rodriguez-Ferre

[11] Patent Number: 5,439,071
[45] Date of Patent: Aug. 8, 1995

[54] CHILD'S TOY VEHICLE HAVING A SAFETY DEVICE

[76] Inventor: José M Rodriguez-Ferre, Poligono Industrial Derramador, Albacete s/n-03440-IBI, Spain

[21] Appl. No.: 167,091
[22] Filed: Dec. 16, 1993
[51] Int. Cl.⁶ ................................................ B60T 7/16
[52] U.S. Cl. .................... 180/167; 180/65.1; 180/220; 446/454; 340/825.31
[58] Field of Search .............. 180/167, 169, 220, 65.1, 180/216, 907; 446/454; 340/901, 825.31, 825.69, 825.72

[56] References Cited

U.S. PATENT DOCUMENTS

| Re. 33,675 | 8/1991 | Young | 180/167 |
| 4,342,175 | 8/1982 | Cernansky et al. | 180/167 X |
| 4,619,231 | 10/1986 | Stolar et al. | 180/167 X |
| 4,776,750 | 10/1988 | Griswold, Jr. et al. | 414/698 |
| 5,053,768 | 10/1991 | Dix, Jr. | 180/167 X |
| 5,137,103 | 8/1992 | Cartmell | 180/167 |
| 5,184,694 | 2/1993 | Magrath, Jr. et al. | 180/167 |

*Primary Examiner*—Margaret A. Focarino
*Assistant Examiner*—Carla Mattix
*Attorney, Agent, or Firm*—Birch, Stewart, Kolasch & Birch

[57] ABSTRACT

A child's toy vehicle having a safety device includes a vehicle having a receiver circuit which may be enabled by an electromagnetic signal emitted by a remote control, handled by an adult, and a pushbutton, in series with a motor, to be depressed by the child driving the vehicle. A switch breaks the supply to the receiver circuit thereby disabling it at the same time as it makes a bridge across the power supply and the child operated pushbutton. The invention is applicable to children's toy vehicles driven by very young children, so that an adult located remotely can break the motor supply to stop the vehicle at any given time, for safety purposes.

5 Claims, 2 Drawing Sheets

CHILD'S TOY VEHICLE HAVING A SAFETY DEVICE

BACKGROUND OF THE INVENTION

Field of the Invention

This invention relates to a child's toy vehicle having a safety device which apart from others inherent in its organization and constitution allows remote disconnection of a motor of the toy vehicle.

Description of Related Art

Already known in the state of the art are toy vehicles prepared for carrying a child who independently drives the vehicle, with complete independence of control. The said vehicles are of the type comprising an electric motor, a power supply formed by dry or wet batteries and an electrical circuit including an easily accessible pushbutton closing the stated motor supply circuit.

As said above, in this type of vehicle the child is completely independent to drive and steer the vehicle in which he is travelling, with the risks inherent thereto. This is why this type of vehicle is for children of a certain age, approximately from four years upwards, but they are not appropriate for younger children, of ages ranging from one to three years, since their lack of driving skill could cause them problems and slight accidents which, although not representing a serious risk, must be avoided so as not to upset the child's emotional state.

Thus, in the present state of the art, there is no child's toy vehicle which, while being capable of being driven by the child himself, includes a safety device which is remotely controlled by an adult, through which the motor supply may be cut to stop the vehicle at any one time, to avoid risks that the child has no faculties to foresee or avoid, said device also serving to reconnect the motor supply when the risk situation has been averted.

SUMMARY OF THE INVENTION

The present applicant has devised a child's toy vehicle including a safety device, thanks to which, a very young child can have access, without any risk, to independent driving of the vehicle, since an adult located remotely has means for disconnecting and connecting the power supply to the motor, leaving it inoperative in the former case and in a position to be energized by the child, in the latter case.

Thus, the device consists of a remote control, the function of which is limited to putting the motor in a state to be connected to the power supply through a push button operated by the child himself, or to break the supply to the motor, leaving it inoperative, in spite of the child persisting in operating the vehicle start pushbutton.

The vehicle also includes a functional selector switch for the toy vehicle which, in a particular position, externally illuminated, disconnects the remote control, but leaves the vehicle motor completely operative for exclusive control by the child.

The present invention offers the advantages described above, apart from others which will be easily gathered from the embodiment of a toy vehicle having a safety device, described in fuller detail hereinafter to facilitate an understanding of the above mentioned features, while disclosing at the same time several details. For such purpose, the specification is accompanied by drawings in which a practical embodiment of the invention is shown as a non-limiting example of the scope of the present invention.

DETAILED DESCRIPTION OF PREFERRED EMBODIMENT

Figure 1A:
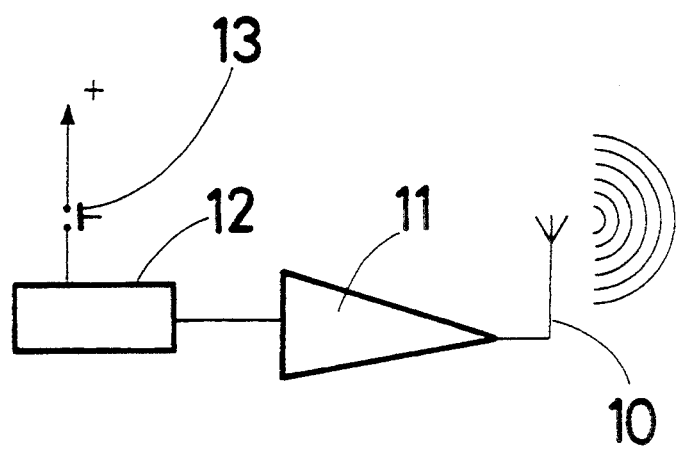
FIGS. 1A and 1B are block diagram of the electronic operation of the toy, according to one embodiment.
Figure 1B:
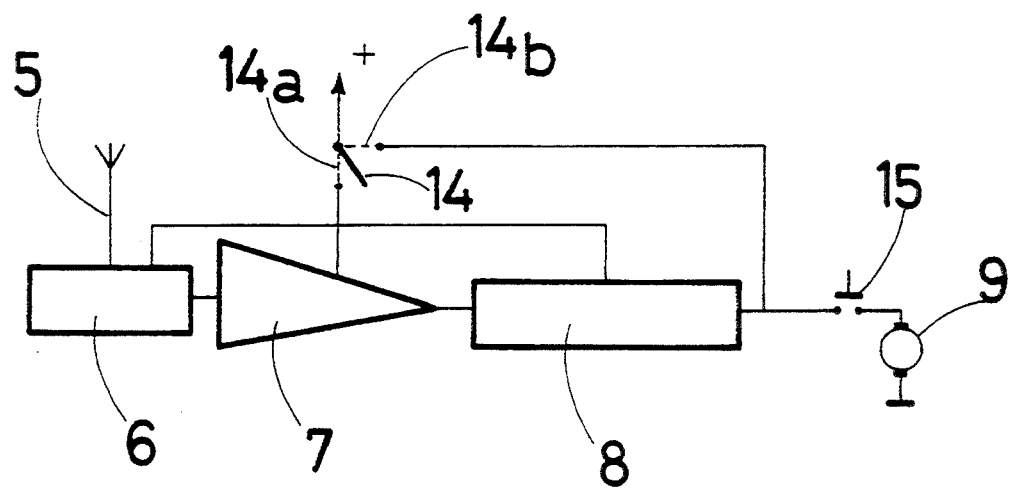
Figure 2:
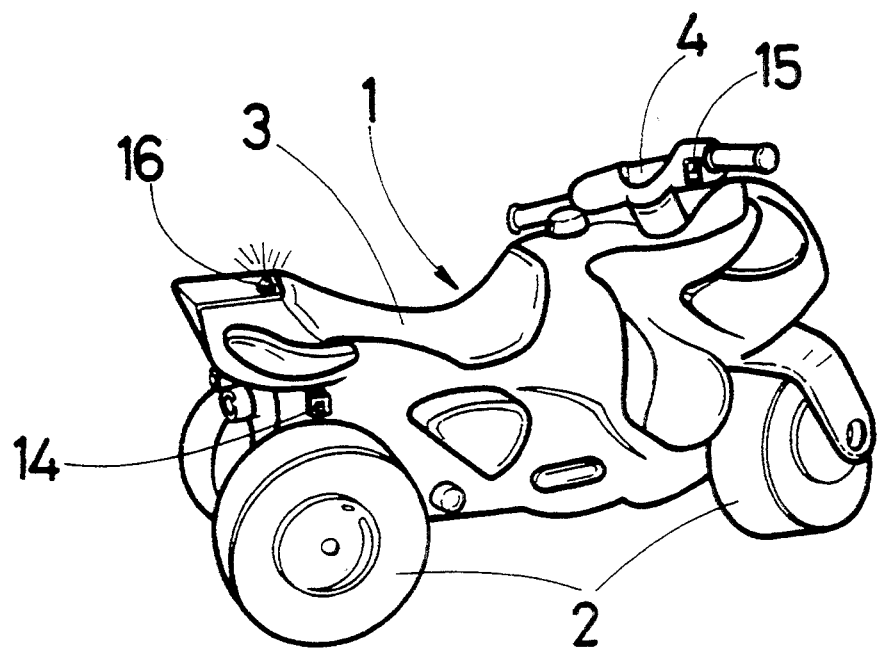
FIGS. 2 and 3 are respective perspective views of the vehicle incorporating the receiver forming an integral part of the toy assembly.
Figure 3:
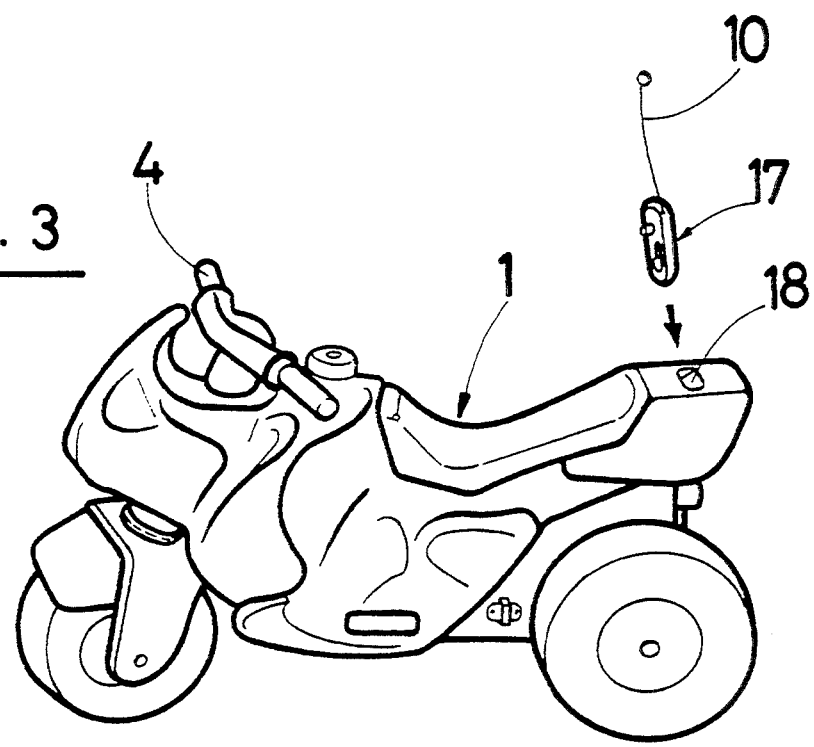

As shown in the drawings, the toy vehicle of the invention comprises a structure, designated generally at 1, resembling a motorcycle, although it could adopt other more or less fanciful forms, comprising at least wheels 2, a seat 3 for the child, and a handlebar or steering wheel 4.

The vehicle 1 comprises a circuit receiving an electromagnetic signal emitted by a remote control or emitter 17, handled by an adult. The receiver circuit is formed by an aerial antenna 5, a sensor 6 and an amplifier 7, connected to the unit 8 energizing the electric motor 9.

Independently there is provided the emitter or remote control designated generally at 17, formed by the aerial antenna 10, amplifier 11 and oscillator 12, including an operating pushbutton 13.

The receiver unit installed in the vehicle 1 has a changeover switch 14 allowing the toy to be used in one of two optional modes.

In the first of the optimal modes, the switch 14 is placed in position 14a, thereby causing a light emitting diode LED 16 to become illuminated. In this situation the receiver circuit is energized and the motor 9 is operated through the receiver 6, 7, 8, energized by the emitter, formed by 10, 11, 12.

Nevertheless, when the start pushbutton 15 is placed in series with the motor 9, for the vehicle motor 9 to operate, it is necessary to energize both the remote control, through its pushbutton 13, and the start switch 15 of the motor 9 of the vehicle 1.

If the adult handling the remote control operates the pushbutton 13, but the child does not press the motor start button 15, the vehicle motor will not operate. In this way, the child always has the final control over the vehicle in which he is seated.

If the child holds the pushbutton 15 depressed, the vehicle will operate while the adult presses the remote control or emitter button 13.

In the latter of the aforementioned options, the switch is in position 14b, in which the LED 16 is extinguished, the remote control receiver being disabled, since the switch breaks the supply to the receiver at the same time as it establishes a bridge to bypass the receiver portion. Therefore, the vehicle is completely operative for exclusive control by the child, without intervention by the adult. In other words, if the child presses the start button 15, the vehicle runs and if he does not press it, it remains at rest.

This second option is reserved for when the child has acquired sufficient experience in the handling of the vehicle to be able to drive it under his own exclusive control.

At the rear of the vehicle there is provided a housing 18 for the remote control 17, when not in use.

I claim:

1. A toy vehicle having a safety device, said toy vehicle including a rolling structure having a seat, an electric motor, a power supply formed by wet or dry wet cells and a handlebar or steering wheel, said safety device comprising:
   a receiver circuit powered by the power supply and fixed to said toy vehicle;
   an emitter device remote from said toy vehicle;
   a first pushbutton formed on said emitter device for emitting an electromagnetic signal and enabling said receiver circuit;
   a second pushbutton arranged in series at an outlet of said receiver circuit; and
   a functional selection switch formed on said toy vehicle in electrical connection between the power supply and said second pushbutton, said functional selection switch including a receiver circuit supply position in which the toy vehicle is operable only if said first pushbutton is actuated, and a receiver circuit interrupt position in which the toy vehicle is operable independently of actuation of said first pushbutton, wherein said receiver circuit is disabled in the receiver circuit interrupt position and said receiver circuit is enabled in the receiver circuit supply position.

2. The toy vehicle of claim 1, wherein said receiver circuit includes an aerial antenna, a sensor, and an amplifier all connected to a unit for energizing the electric motor.

3. The toy vehicle of claim 1, wherein said emitter device includes an aerial antenna, an amplifier and an oscillator.

4. The toy vehicle of claim 1, further including means for indicating positioning of said functional selection switch in the receiver circuit supply position.

5. The toy vehicle of claim 1, further comprising a housing in connection with said toy vehicle for storing said emitter device.

* * * * *